United States Patent Office 2,975,961

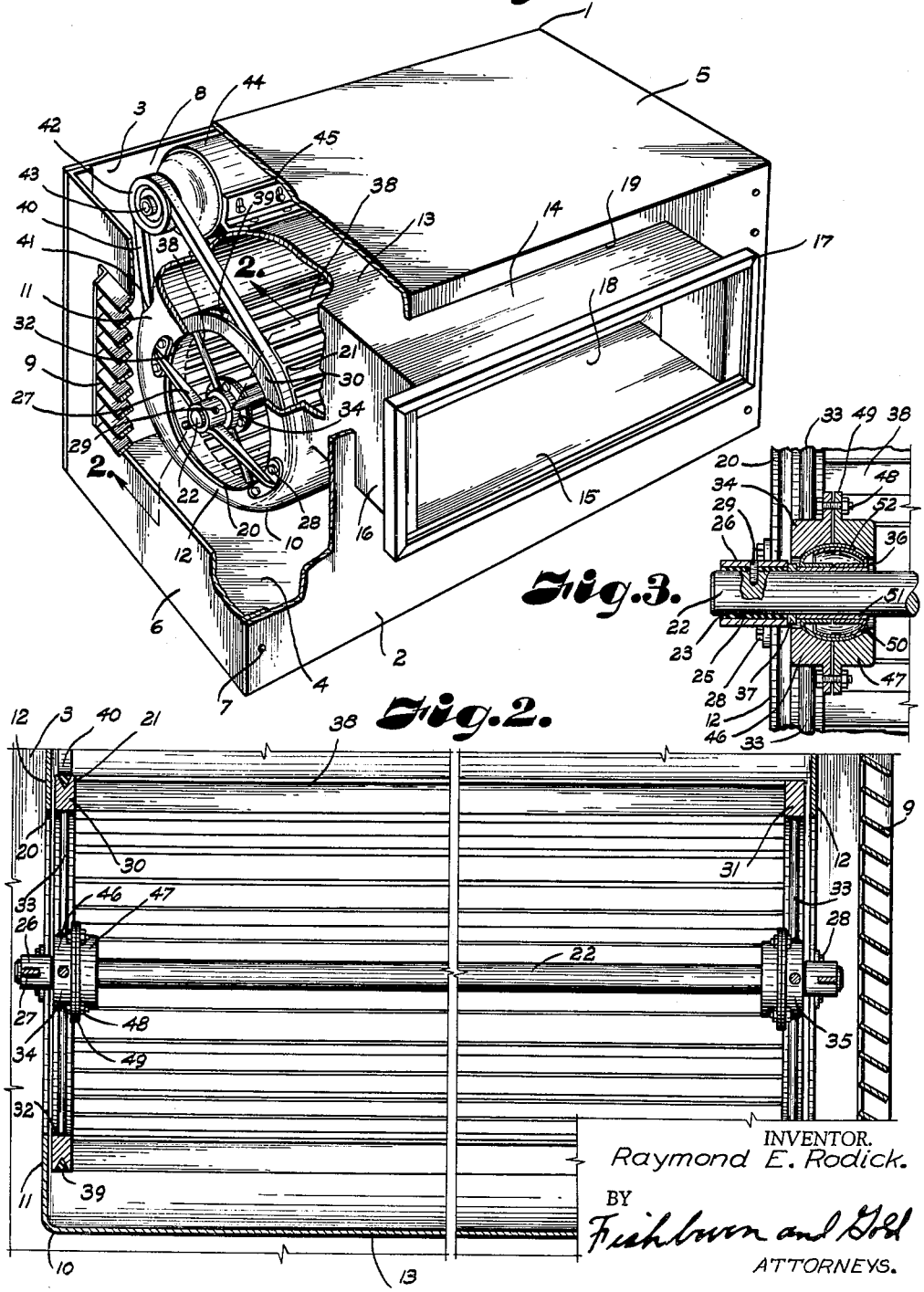

Patented Mar. 21, 1961

2,975,961

BLOWER UNIT

Raymond E. Rodick, Sedalia, Mo., assignor, by mesne assignments, to The Steam-O-Matic Corporation, Sedalia, Mo., a corporation of Missouri Filed July 23, 1958, Ser. No. 750,322

4 Claims. (Cl. 230—117)

This invention relates to blower units adapted to be used in evaporative coolers, window ventilators, furnace boosters and the like, and more particularly to a novel blower unit and impeller mounting and drive therefor.

The principal objects of the present invention are to provide a blower unit having a belt pulley formed in the periphery of the blower rotor or impeller and positioned within the blower casing; to provide such a structure wherein the impeller is rotatably mounted on a stationary shaft; to provide such a structure in which the shaft is supported in resilient mountings and the impeller is rotated on self-aligning bearings; to provide a blower structure having a motor drive operatively connected by a belt extending into the blower casing and operatively engaged with the impeller pulley fixed to the impeller substantially at the periphery thereof whereby a substantial portion of the drive is enclosed in the blower casing; to provide such a blower unit wherein the drive for the impeller permits a lesser over-all width for a given capacity of blower; and to provide a blower structure with an impeller mounting and drive that is relatively compact and that is economical to manufacture and efficient in operation.

Other objects and advantages of this invention will become apparent from the following description taken in connection with the accompanying drawings wherein are set forth by way of illustration and example certain embodiments of this invention.

Fig. 1 is a perspective view of a blower unit with a portion thereof broken away and representing an embodiment of the present invention.

Fig. 2 is a partial longitudinal sectional view through the blower unit and rotor thereof.

Fig. 3 is an enlarged sectional view through one end mounting of the rotor.

Referring more in detail to the drawings:

1 designates a housing or cabinet which can be made of any suitable materials. The housing includes a front wall 2, back wall 3, bottom wall 4, top wall 5 and end walls 6 suitably connected together as by fastening devices 7 to define a space 8 interiorly of the housing. Certain walls such as the end walls 6 preferably have louvered openings 9 for entry of air into the chamber 8. A blower unit 10 is mounted in the chamber 8 in the housing 1, said blower having a casing 11 of conventional shape which includes spaced end walls 12 and a continuous casing peripheral wall 13 extending around and connected to the edges of said end walls. The continuous casing peripheral wall is in the form of a scroll sheet with the ends thereof extending outwardly in substantially parallel relation to form top and bottom walls 14 and 15 which have their end edges connected by end walls 16 to define a discharge duct 17 forming an outlet opening 18 from the blower casing. The duct 17 extends through an opening 19 in the front wall 2 of the housing 1.

The blower casing has at least one inlet opening and in the illustrated structure the end walls 12 of the blower casing have aligned inlet openings 20 and an impeller or rotor 21 is arranged in the blower casing and revolved on a longitudinal axis aligned with said end wall air inlet openings 20. In the illustrated structure, the impeller 21 is rotatably mounted on a stationary shaft 22 having its ends supported in caps or bushings 23 of resilient material such as rubber or the like. The bushings 23 are supported in bores 25 of supports 26 which include arms 27 having their opposite ends secured to the casing end walls 12 by suitable fastening devices 28. The shaft 22 and bushings 23 are held against endwise motion relative to the supports 26 by means of suitable fastening devices 29.

The impeller 21 has spaced end members 30 and 31 that are circular or ring-shaped whereby the inner surfaces thereof define air inlet openings 32 which preferably are axially aligned with and of substantially the same diameter as the air inlet openings 20 in the end walls of the casing. A plurality of spaced spokes 33 connect the end members 30 and 31 with hubs 34 and 35 respectively, in which are mounted bearings 36 that are rotatably mounted on the shaft 22. Spacers 37 are preferably arranged between the bearings 36 or hubs and the supports 26 to substantially eliminate longitudinal or endwise motion of the impeller relative to the casing whereby the end members 30 and 31 are positioned closely adjacent to the end walls 12 of the blower casing. The impeller 21 is substantially cylindrical with the wall thereof between the end members 30 and 31 consisting of a plurality of spaced blades 38 that extend longitudinally of the impeller and have their ends connected to the end members 30 and 31. The blades 38 and end members 30 and 31 may be integral and formed from sheet metal, or the end members may be formed separately and the blades secured thereto. The disposition and arrangement of the impeller and blades therein and the casing being such that rotation of the impeller draws air through the inlet openings 20 into the interior of the impeller and forces it outwardly between the blades 38 and through the casing outlet opening 18 in the duct 17. The impeller 21 is formed with a portion having a belt receiving groove 39 thereon. The belt receiving groove 39 may be at any position along the length of the impeller or may be at an end thereof. In the illustrated structure, the groove 39 is in the peripheral portion of the end member 30 and is operatively engaged by a belt 40, the runs of which extend through openings 41 in the scroll or peripheral portion of the blower casing 10, said belt being operatively engaged over a motor pulley 42 mounted on a driven shaft 43 of a motor 44 that is suitably mounted as by brackets 45 on the casing 10, as illustrated in Fig. 1, whereby operation of the motor 44 rotates the pulley 42 and through the belt 40 rotates the impeller or rotor 21. It is preferable that the apertures or openings 41 be relatively small yet permit the belt runs to pass therethrough without contact with the wall of the casing. With this structure, the impeller pulley is an integral part of the impeller and is within the blower casing, and a substantial portion of the belt 40 is also within the casing, providing a substantially enclosed drive for the impeller. The motor may be mounted inside the casing or extension thereof to completely enclose the impeller drive, if desired.

In the structure illustrated, the impeller is mounted on self-aligning bearings, as illustrated in Fig. 3. The hubs 34 and 35 are each made in two pieces 46 and 47, the piece 46 being attached to the spokes 33 and the piece 47 being secured to the piece 46 by suitable fastening devices such as bolts 48 extending through mating flanges 49 on the hub pieces. The hubs have substantially spherical sockets 50 for receiving the respective bearing 36. The bearing illustrated has a bushing 51 sleeved on the shaft 22 and rotatably mounted thereon. The bushing is held in a holder or member 52 having a substantially spherical periphery or outer surface that is received in the spherical socket 50 whereby the bearing member 52 can pivot in the hub to provide a self-aligning effect in the bearings mounting the impeller.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. A blower unit comprising, a casing including a pair of spaced end walls and a peripheral wall extending around the edges of said end walls, means at the ends of the peripheral wall defining a casing outlet opening, a casing end wall having an inlet opening, a shaft extending through the casing with the longitudinal axis thereof aligned with the end wall inlet opening, means secured to said end walls and supporting the end portions of said shaft, an elongate air impeller having spaced end members and spaced blades in the periphery of the impeller and extending between said end members, said impeller being carried by said shaft and rotatably mounted in said casing with said end members adjacent the end walls of the casing, said impeller having a belt receiving groove in the periphery thereof, a motor supported on the casing, a pulley on said motor and driven thereby, and a belt operatively connecting the motor pulley and impeller belt groove for rotating said impeller, the disposition and arrangement of the impeller and casing being such that rotation of the impeller draws air through said inlet opening into the interior of the impeller and forces it outwardly through the outlet opening.

2. A blower unit comprising, a casing including a pair of spaced end walls and a continuous peripheral casing wall extending around the edges of said end walls and defining a scroll shape, said peripheral wall having an outlet opening, a casing end wall having an air inlet opening, a shaft extending through the casing with the longitudinal axis aligned with the end wall inlet opening, support members secured to said end walls and extending across said inlet openings, means on said support members engaged with the end portions of the shaft for mounting said shaft, an elongate air impeller having spaced end members and spaced longitudinally extending blades between said end members and fixed thereto, an impeller end member having an opening therein substantially coaxial with the end wall inlet opening, hubs axially positioned relative to said end members, a plurality of spaced spokes connecting the hubs with said end members to support said end members on said hubs, bearing members in said hubs and rotatably mounted on said shaft whereby said bearing members rotatably mount the impeller on the shaft, said impeller having a belt-receiving groove in the periphery of an end member thereof, a motor supported on the casing, a pulley on said motor and substantially coplanar with the peripheral belt-receiving groove in the impeller, and a belt operatively connecting the motor pulley and engaged in the groove of the impeller end member for rotating said impeller, the disposition and arrangement of the impeller and casing being such that rotation of the impeller draws air through said inlet opening into the interior of the impeller and forces it outwardly through the outlet opening.

3. A blower unit comprising, a casing including a pair of spaced end walls and a continuous peripheral casing wall extending around the edges of said end walls and defining a scroll shape, said peripheral wall having an outlet opening, at least one of said end walls having an air inlet opening, a shaft extending through the casing with the longitudinal axis aligned with the end wall inlet opening, support members secured to said end walls and extending across said inlet opening, means on said support members and engaging the end portions of the shaft for mounting said shaft, an elongate air impeller having spaced end members and spaced longitudinally extending blades between said end members and fixed thereto, one of said end members having an opening therein adjacent the end wall inlet opening, hubs axially positioned relative to said end members, a plurality of spaced spokes connecting the hubs with said end members to support said end members on said hubs, self-aligning bearing members rotatably mounted on said shaft and engaged in the hub members whereby said bearing members rotatably mount the impeller on the shaft, said impeller having a peripheral belt-receiving groove within said casing, a motor supported on the casing, a pulley on said motor and substantially coplanar with the peripheral belt-receiving groove in the end member of the impeller, and a belt operatively connecting the motor pulley and engaged in the peripheral groove of the impeller for rotating said impeller, the disposition and arrangement of the impeller and casing being such that rotation of the impeller draws air through said inlet opening into the interior of the impeller and forces it outwardly through the outlet opening.

4. A blower unit comprising, a casing including a pair of spaced end walls and a continuous peripheral casing wall extending around the edges of said end walls and defining a scroll shape, said peripheral wall having an outlet opening, at least one of said end walls having an air inlet opening, a shaft extending through the casing with the longitudinal axis aligned with the end wall inlet opening, support members secured to said end walls and extending across said inlet openings, resilient members on said support members and sleeved on the end portions of the shaft for resiliently mounting said shaft, an elongate air impeller having spaced end members and spaced longitudinally extending blades between said end members and fixed thereto, one of said end members having an opening therein adjacent the end wall inlet opening, hubs axially positioned relative to said end members, a plurality of spaced spokes connecting the hubs with said end members to support said end members on said hubs, self-aligning bearing members rotatably mounted on said shaft and engaged in the hub members whereby said bearing members rotatably mount the impeller on the shaft, means retaining the impeller against endwise motion relative to the casing, one of said impeller end members having a peripheral belt-receiving groove, a motor supported on the casing, a pulley on said motor and substantially coplanar with the peripheral belt-receiving groove in the end member of the impeller, and a belt operatively connecting the motor pulley and engaged in the groove of the impeller end member for rotating said impeller, the disposition and arrangement of the impeller and casing being such that rotation of the impeller draws air through said inlet opening into the interior of the impeller and forces it outwardly through the outlet opening.

References Cited in the file of this patent

UNITED STATES PATENTS

| | | |
|---|---|---|
| 1,669,459 | Feinberg et al. | May 15, 1928 |
| 1,669,951 | Stitt | May 15, 1928 |
| 2,100,439 | Friedman | Nov. 30, 1937 |
| 2,299,010 | Doman | Oct. 13, 1942 |
| 2,450,647 | Essick | Oct. 5, 1948 |
| 2,798,660 | Flynn | July 9, 1957 |
| 2,827,225 | Killian | Mar. 18, 1958 |
| 2,849,118 | Ashton | Aug. 26, 1958 |

FOREIGN PATENTS

| | | |
|---|---|---|
| 19,674 | Great Britain | of 1908 |